United States Patent Office 3,492,710
Patented Feb. 3, 1970

3,492,710
MOUNTING OF A BEARING IN A BORE
Alfred Pitner, Paris, France, assignor to Nadella S.A.,
Rueil-Malmaison, France, a French body corporate
Filed Mar. 7, 1967, Ser. No. 621,301
Claims priority, application France, Mar. 25, 1966,
54,995
Int. Cl. B21h *1/14;* B21k *1/02*
U.S. Cl. 29—148.4                    13 Claims

ABSTRACT OF THE DISCLOSURE

A method for mounting a bearing comprising a cup having a transverse end wall in a smooth bore around a shaft whose end must bear against the end wall of the cup, by means of an auxiliary retaining element which could also reinforce the end wall. The bearing and the auxiliary element are interconnected by a connection which is at least temporary before mounting the bearing in the bore. The connection allows small relative movements between the end wall and the auxiliary element during insertion of the cup and auxiliary element in the smooth bore.

---

Various methods have been proposed for mounting in a smooth bore a bearing in the form of a cup which surrounds a shaft or journal having an end which abuts the end of the bearing, said methods comprising in particular the utilization of an auxiliary element adapted to maintain the bearing in position by the insertion thereof in the required position in the bore. This method is applicable for example to the mounting of needle cups.

In the case of needle cups, this auxiliary element is not obtained by machining but by a forming operation on sheet steel and moreover performs the function of a reinforcement for the thin end of the wall of the cup which is often subjected to considerable forces in particular in universal joints. In some methods, the cup is not retained in position by an auxiliary element but by deformation of the metal of the smooth bore. However, in this case it is well to provide such an element as a reinforcement for the end wall of the cup or simply to improve the performance of the bearing.

Consequently, in either case, there is employed both a needle cup and an auxiliary element performing the function of a direct or indirect retaining means and reinforcing means or merely a reinforcing means. At the present time, these two elements are handled separately and placed in position in the bore one after the other.

The object of the invention is to simplify the known assembly method. The invention provides a method in which the bearing and the auxiliary element are interconnected by a connection which is at least temporary before placing the bearing in position in the bore so that the handling and the positioning of the two elements is ipso facto simultaneous. The connection must be such that very slight relative movements are possible either in the course of the various stages of the assembly or only in the course of the last stage so as to allow small relative movements which are necessary in particular to avoid an excessive stress in the connecting means. This interconnection can be such as to cease as soon as the auxiliary element is directly inserted in the bore forming a housing for the cup.

According to the invention this interconnection of the two elements is preferably achieved by interposing a binder between the two complementary faces of the cup and the auxiliary element which acts by means of a suction phenomenon due to elimination of air between the two elements or by adhesion, or by the effect of these two phenomena. This has the advantage of interconnecting the two elements by forces which are such as to allow the handling and utilization thereof without danger of disconnection or even marked off-centre of the auxiliary element and moreover allow small movements of the auxiliary retaining element relative to the cup in the course of the final positioning as a result of the deformation of the retaining element, for example when it is fixed by the insertion thereof in the inner wall of the bore.

The binder can be so chosen as to remain in a plastic state during the mounting operations. This is the case for example of depolymerized rubber.

A hardenable adhesive can also be employed as a binder, the mounting of the cup and retaining element being carried out after the adhesive has hardened. Such a binder has the advantage over the plastic binder of permitting an accurate centering of the retaining element on the cup owing to the rigid interconnection of the two elements in the course of handling and positioning, but it must be in the form of a film capable of being deformed and even sheared under the effect of deliberately-applied forces so as to allow the small relative movements related to the deformation which the retaining element undergoes when it is placed in its final position.

It should be mentioned that the binders to be used are preferably those capable of being employed even on non-degreased parts and having of course a pH which is such that no oxidation of the parts is to be feared.

The interconnection can also be achieved by welding, brazing or mechanical fixing.

The method according to the invention can be in particular employed for simplifying the assembly of universal joints as taught in the French Patent No. 1,382,264 filed on Nov. 5, 1963. The latter discloses an assemblage in two stages one of which is a preassembly stage comprising placing the needle cups with an axial clearance at the ends, which is important, so as to permit the relative centering of the universal joint jaws or of the jaw relative to the cross member, the other stage being a final assembly stage comprising placing in position and fixing the auxiliary element. These two stages can be combined if the cups are connected to the auxiliary element in accordance with the present invention. Indeed, it is sufficient to place the sub-assemblies consisting of the cups provided with needles and the auxiliary elements adhering thereto, in a fixture adapted to put the cross-member and the two jaws or one of the latter, in correct relative position and thereafter to introduce it simultaneously in each bore of the same jaw.

In a first part of the travel, the sub-assembly of the two elements is positioned on each side of the cross-member until it bears against the end faces of the cross-member and in a second part of this travel, the fixing of the sub-assembly is achieved by deformation and insertion of the auxiliary element in the wall of the bore or by deformation of the metal of the wall of the bore so as to support the auxiliary element or by any other means for precisely fixing and maintaining the cup in the bore.

Further features and advantages of the invention will be apparent from the ensuing description with reference to the accompanying drawing.

Figure 1:
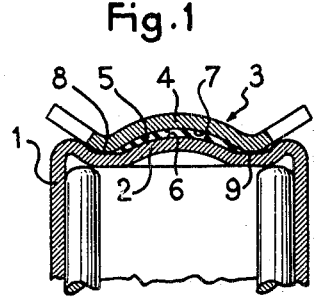
FIG. 1 is an axial sectional view of a needle cup whose end wall is connected to a retaining element.

FIG. 1 shows a needle cup 1 whose end wall 2 is dome-shaped and connected to an auxiliary element having a curved portion 4, whose shape is similar to that of the end wall of the cup, by means of a layer of binder 5 interposed between the outer face 6 of the end wall 2 and the inner face 7 of the curved portion 4. This binder can be depolymerized rubber or like material, such as polysulphide polymer or epoxide resin, and acts both by its proper adhesion and by elimination of air when it is placed in position.

Figure 2:
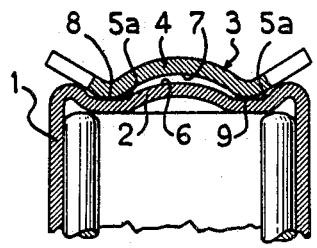
FIG. 2 is a view similar to FIG. 1 of another manner of connecting the cup to the retaining element.

In FIG. 2 the binder consists of hardened adhesive 5a interposed between the outer face 8 of the plane annular portion of the end wall of the cup 1 and the inner face of the corresponding portion 9, which is plane or slightly toric, of the auxiliary element 3. This adhesive has physical properties which are such that it is easy to deform or shear this film of adhesive.

Figure 3:
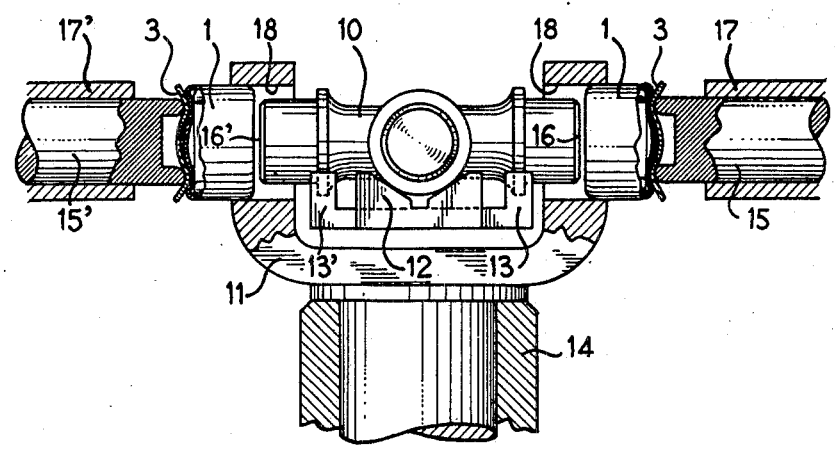
FIG. 3 is a diagrammatic sectional view showing the utilization of the needle cups shown in FIG. 1 or 2 in a universal joint assembly.

FIG. 3 shows an assembly of a cross-member 10 in a jaw or element of a universal joint 11, these two elements being approximately centered relative to each other by any known means, for example by those shown by way of example and comprising two V-blocks 12 and 13 which are orthogonal and support and hold the cross-member in a definite position relative to the axis of the jaw supported in a bore 14 of the assembling fixture. By the successive utilization of a pair of annular mandrels 15 and 15' for positioning the sub-assemblies until they bear against the end faces 16 and 16' of the cross-member then a pair of hollow mandrels 17 and 17' adapted to spread the peripheral marginal portions of the auxiliary element 3 connected to the corresponding cup 1 there is rapidly, effectively and accurately obtained the final positioning in the bores 18 of the jaw 11 of each sub-assembly consisting of a cup and an auxiliary element, the latter performing the function of means retaining the cup 1 and reinforcing the end wall 2 of this cup.

Although a specific embodiment of the invention has been described, many modifications and changes may be made therein without departing from the scope of the invention as defined in the appended claims.

Having now described my invention what I claim as new and desire to secure by Letters Patent is:

1. A method for mounting a bearing in a smooth bore in a first element surrounding a shaft, said bearing comprising a cup having a transversely extending end wall and said shaft having an end face which must bear against said end wall, said method comprising taking an auxiliary element for axially retaining said bearing in said bore, interconnecting said end wall of said cup and said auxiliary element before mounting the bearing in the bore by connecting means, inserting said interconnected cup and auxiliary element in said bore, and deforming the material of one of said elements so as to achieve rigid engagement between said elements and thereby axially retain said bearing in said bore, said connecting means being capable of maintaining the interconnection of said end wall and said auxiliary element when inserting them in said bore and further capable of allowing small relative movements between said end wall and said auxiliary element during the insertion thereof in said bore and during said deformation of the material of one of said elements.

2. A method as claimed in claim 1, wherein the bearing and the auxiliary element are centered relative to each other.

3. A method as claimed in claim 1, wherein the connecting means is temporary and has a connecting effect which lasts until the auxiliary element has been correctly inserted in the bore.

4. A method for mounting a bearing in a smooth bore in a first element surrounding a shaft, said bearing comprising a cup having a transversely extending end wall and said shaft having an end face which must bear against said end wall, said method comprising taking an auxiliary element for axially retaining said bearing in said bore, interconnecting said end wall of said cup and said auxiliary element before mounting the bearing in the bore by connecting means, inserting said interconnected cup and auxiliary element in said bore, and deforming the material of one of said element so as to achieve rigid engagement between said elements and thereby axially retain said bearing in said bore, said connecting means being a layer of a binder interposed between the corresponding faces of the end wall and the auxiliary element and capable of maintaining the interconnection of said end wall and said auxiliary element when inserting them in said bore and further capable of allowing small relative movements between said end wall and said auxiliary element during the insertion thereof in said bore and during said deformation of the material of one of said elements.

5. A method as claimed in claim 4, wherein the binder is a plastics material.

6. A method as claimed in claim 4, wherein the binder is depolymerized rubber.

7. A method as claimed in claim 4, wherein the binder is a polysulphide polymer.

8. A method as claimed in claim 4, wherein the binder is hardenable and allows a deformation of the binder between the end wall and the auxilary element under the effect of a deliberately applied force.

9. A method as claimed in claim 4, wherein the binder is hardenable and allows an easy shearing of the binder between the end wall and the auxiliary element under the effect of a deliberately applied force.

10. A method as claimed in claim 1, wherein said connectinng means is a brazing.

11. A method as claimed in claim 1, wherein said connecting means is a welding.

12. A method as claimed in claim 1, wherein the shaft is placed in position and held relative to the bore before the bearing and the auxiliary element constituting a sub-assembly is inserted in the bore until the end wall bears against the shaft end face, whereafter said material of one of said elements is deformed.

13. A sub-assembly for an assembly comprising a shaft and a bore, said sub-assembly comprising a bearing cup having an end wall, a retaining element, and a connecting means connecting the retaining element to the end wall, the connecting means being capable of maintaining the connection of the retaining element to the end wall for handling purposes before and upon insertion of the sub-assembly in said bore and further capable of allowing small relative movements between the end wall and the retaining element during said insertion.

References Cited

UNITED STATES PATENTS

| | | |
|---|---|---|
| 2,078,739 | 4/1937 | Slaght. |
| 2,256,624 | 9/1941 | Odlum _____ 64—17 |
| 2,353,299 | 7/1944 | Dunn _____ 64—17 |
| 3,062,026 | 11/1962 | Pitner _____ 29—148 |

THOMAS H. EAGER, Primary Examiner

U.S. Cl. X.R.

29—149.5, 453; 64—17; 308—213

UNITED STATES PATENT OFFICE
CERTIFICATE OF CORRECTION

Patent No. 3,492,710              Dated February 3, 1970

Inventor(s) ALFRED PITNER

It is certified that error appears in the above-identified patent and that said Letters Patent are hereby corrected as shown below:

In the Heading, Column 1, line 3, after "assignor" insert --of an undivided one-half interest--.

Signed and sealed this 12th day of February 1974.

(SEAL)
Attest:

EDWARD M. FLETCHER, JR.          C. MARSHALL DANN
Attesting Officer                 Commissioner of Patents